United States Patent [19]
Curtis et al.

[11] Patent Number: 5,307,927
[45] Date of Patent: May 3, 1994

[54] COMPACT DISC PACKAGE AND A METHOD FOR MAKING SAME

[75] Inventors: Michael Curtis, Hickory Hills; Dean Henkel, Carolstream; James Oppenheimer, Chicago, all of Ill.

[73] Assignee: AGI Incorporated, New York, N.Y.

[21] Appl. No.: 758,662

[22] Filed: Jan. 12, 1991

[51] Int. Cl.⁵ .............................................. B65D 85/30
[52] U.S. Cl. ................................ 206/312; 206/45.14; 206/45.28.309
[58] Field of Search ............ 206/45.24, 45.29, 45.14, 206/309, 310, 312, 444, 491; 229/5.7; 220/648, 649

[56] References Cited
U.S. PATENT DOCUMENTS

| | | | |
|---|---|---|---|
| 3,452,918 | 7/1969 | Froehlig | 206/309 |
| 3,507,385 | 4/1970 | George | 206/312 |
| 3,595,383 | 7/1971 | Boylan | 206/312 |
| 4,627,531 | 12/1986 | Clemens | 206/312 |
| 4,694,954 | 9/1987 | Moss | 206/45.24 |
| 4,709,812 | 12/1987 | Kosterka | 206/310 |
| 5,078,270 | 1/1992 | Campbell | 206/444 |
| 5,085,318 | 2/1992 | Leverick | 206/312 |
| 5,101,973 | 4/1992 | Martinez | 206/312 |

FOREIGN PATENT DOCUMENTS

| | | | |
|---|---|---|---|
| 1164422 | 10/1958 | France | 206/312 |
| 2219573 | 12/1989 | United Kingdom | 206/309 |

Primary Examiner—David T. Fidei
Attorney, Agent, or Firm—Stephen D. Kahn

[57] ABSTRACT

A package for a compact disk formed from a prescored, preprinted unitary blank or sheet and at least one injection molded plastic compact disc holder in which the front panel, for retail display purposes, is not folded over the panel containing the CD but is instead left in an unfolded orientation, as an extension of the CD-containing panel, and is held in that unfolded or open orientation by at least one and preferably two J-shaped members or clips made of a resilient material such as plastic. Also, a method for making same.

18 Claims, 4 Drawing Sheets

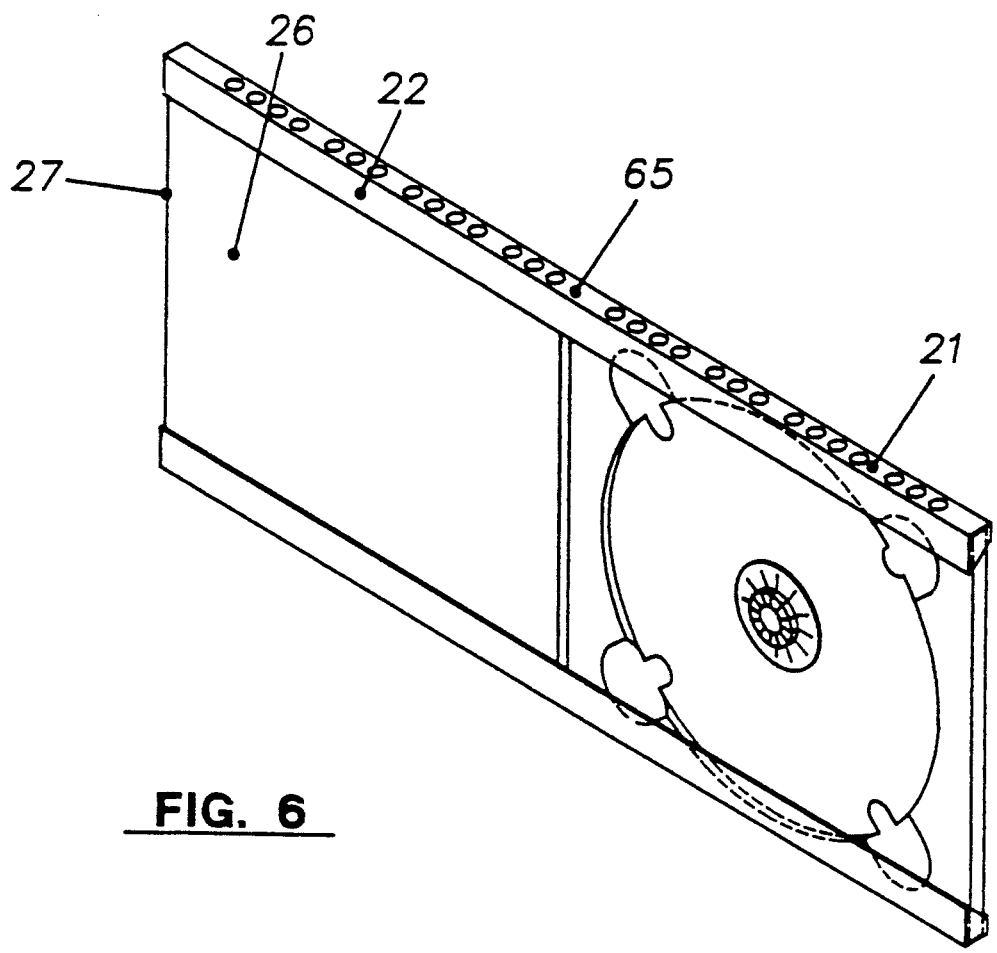
FIG. 6
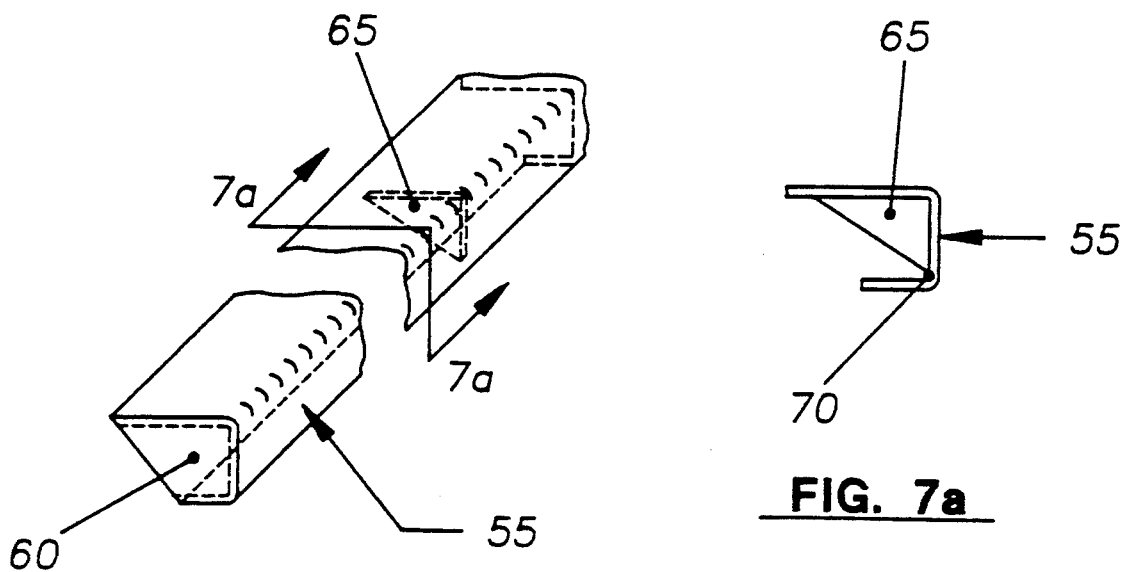
FIG. 7
FIG. 7a

COMPACT DISC PACKAGE AND A METHOD FOR MAKING SAME

BACKGROUND OF THE INVENTION

The "compact disc" or "CD," a 4.7 inch diameter metal record containing laser-readable information, has become a significant consumer product in the field of recorded music. With the advent of the compact disc and compact disc players approximately five years ago, there arose a concomitant need for an attractive, durable package in which to display, sell and store the compact disc. The two most popular of these packages are 1) the so-called "jewel box," generally comprising three separate pieces of plastic, including clear front and back package panels and an opaque compact disc holder which snapfits into the back package panel, and 2) the DIGIPAK ®, generally comprising a unitary paperboard blank that is cut, scored and folded so that at least one compact disc holder may be adhered thereto and the package will hold, protect and present an attractive display for the compact disc(s). The DIGIPAK ® is the subject matter of U.S. Pat. No. 4,709,812 (the "'812 patent") which is assigned to the assignee of the present invention. Currently, both the jewel box and the DIGIPAK ® are packaged for sale to consumers in the United States inside a 6 inch by 12 inch cardboard box ("the 6 by 12 box"), which is ordinarily covered with shrink-wrap clear plastic.

The 6 by 12 box serves at least three functions at retail. An important function of the 6 by 12 box is to prevent theft of CD packages from retail stores. Retail theft is such a significant problem in the retail music business in the United States that having the 6 by 12 box was a major part of the marketing impetus that allowed compact discs to gain acceptance from retail merchants, and thus to begin to replace vinyl record albums and cassette tapes in retail stores as the primary source of recorded music for consumers. Thus, it is important that any alternative package to the 6 by 12 box preserve the anti-theft quality the 6 by 12 box provides.

The 6 by 12 box also fits into the existing fixtures in retail music stores that were originally configured for the display of 12 inch by 12 inch vinyl record albums. These fixtures, therefore, did not have to be reconfigured in order to accept the 6 by 12 boxes, since they can simply hold two 6 by 12 boxes where they previously held one album. This presented a significant advantage for the sale of compact discs by the retail recorded music industry.

The 6 by 12 box also provides a larger surface than the approximately 5 by 5 inch surface area of the jewel box or folded DIGIPAK ® on which various graphic art displays can be presented to consumers.

However, despite these advantages over a container roughly 5 inches in diameter, in recent years the 6 by 12 box has come under attack from a number of sources. Ecological groups and others have sought to have the 6 by 12 box removed from the marketing and packaging of compact discs because of the amount of unnecessary packaging materials involved. Consumers and members of the recording industry have also expressed dissatisfaction with having to discard the 6 by 12 box. Thus, a new packaging alternative is needed in order to both preserve the advantages that the 6 by 12 box has offered and to comply with the demands of consumers, recording artists and retailers who have emphasized the disadvantages of the current system for the packaging and sale of compact discs in the 6 by 12 box.

The present invention combines the best features and advantages of the 6 by 12 box and eliminates many of the significant disadvantages thereof. The present invention comprises a DIGIPAK ® constructed generally as disclosed in the '812 patent, in which the front panel, for retail display purposes, is not folded over the panel containing the CD but is instead left in an unfolded orientation, as an extension of the CD-containing panel, and is held in that unfolded or open orientation by at least one and preferably two J-shaped members or clips made of a resilient material such as plastic. With the front panel held in an open orientation, the DIGIPAK ® itself comprises a package roughly the size of a 6 by 12 box, thereby preserving the anti-theft and other desirable qualities of the package without adding to the packaging and waste disposal problems associated with the present 6×12 boxes.

Referring to the drawings:

FIG. 6 shows a perspective view of the CD package shown in FIG. 5, in a partially closed orientation, for retail display and sale purposes.

FIG. 7 shows a perspective view of a modified track.

FIG. 7a shows a cross-sectional view of a modified track.

DESCRIPTION OF THE PREFERRED EMBODIMENT

Figure 1:
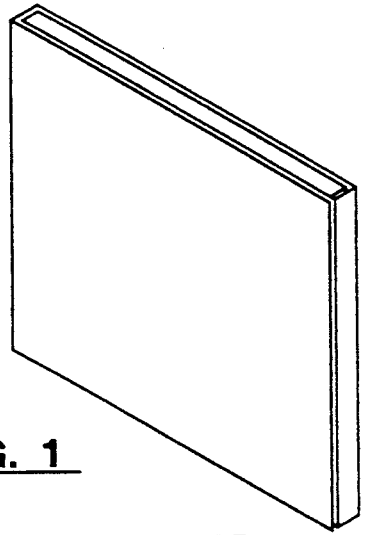
FIG. 1 shows a perspective view of a CD package of the type generally known as a DIGIPAK ® in a closed orientation such as it would have while being stored or handled by a consumer.

Referring to FIGS. 1-4, a DIGIPAK CD package generally comprises at least two panels 21 and 22 separated by a relatively narrow dividing strip 23. A CD holder 24 of known construction is affixed to panel 21 as is disclosed in the '812 patent. When a consumer is storing or handling the package, the front panel 22 would generally be folded over, in front of the rear panel 21 along a fold line at the edge of dividing strip 23, as is shown in FIG. 1 and described in the patent identified above, and the CD would therefore be protected from scratching or other mishandling. Before panel 22 is folded over to close the package, shown in FIG. 1, however, the elements are in the configuration shown in FIG. 2.

Figure 2:
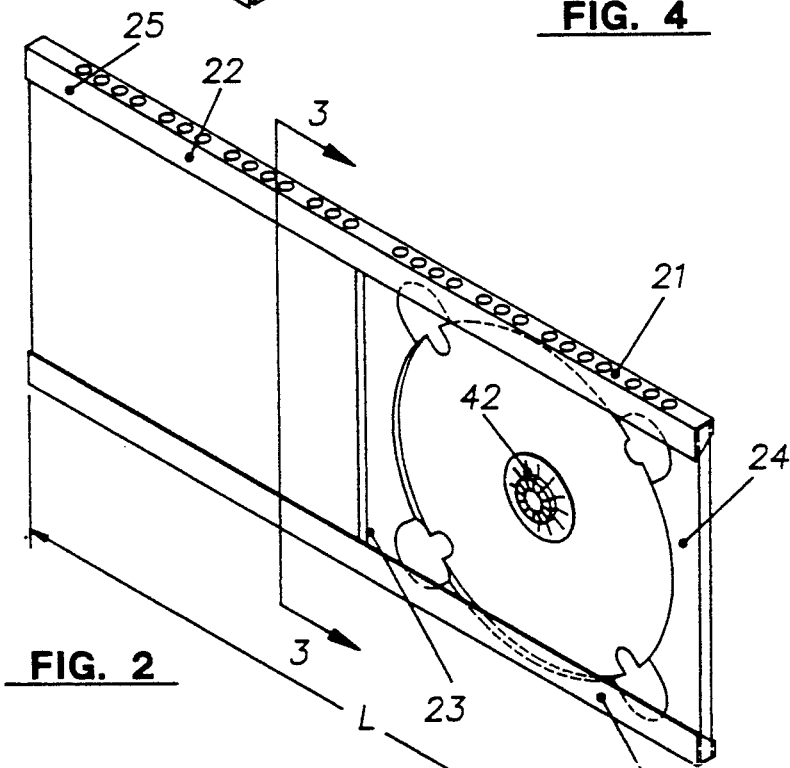
FIG. 2 shows a perspective view of the CD package of FIG. 1 in its open configuration, for retail display and sale purposes, including the combination of elements comprising the present invention.

The present invention takes advantage of the initial orientation of the DIGIPAK ® components shown in FIG. 2 by adding, along one or, preferably, both panels a resilient track or clip member 25. Track member 25 is sufficiently elongated that it spans dividing strip 23 and extends at least part way—and usually all the way—along front panel 22 and rear panel 21, thereby holding them in the configuration shown in FIG. 2. In that configuration, the overall CD package has a total effective length L, shown in FIG. 2, that is equal to the sum of the widths of front panel 22, dividing strip 23 and rear panel 21. Preferably these elements are dimensioned so that the total length L is approximately twelve inches.

Figure 4:
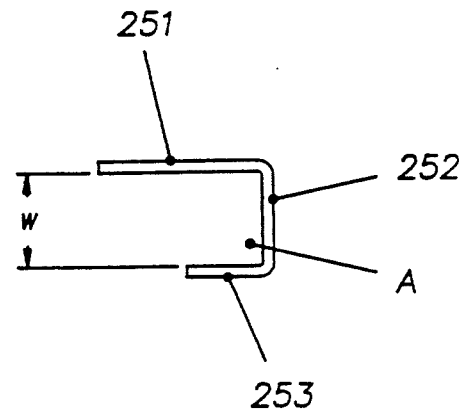
FIG. 4 shows a cross-sectional view of one of the tracks that hold the parts of the DIGIPAK ® CD package in their desired orientation for display.
Figure 3:
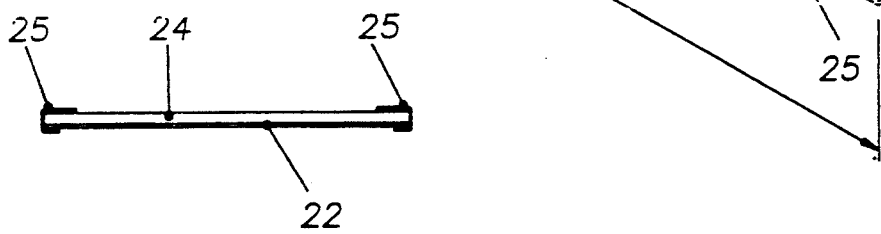
FIG. 3 shows a cross-sectional view of the package shown in FIG. 2, at the section marked 3—3.

As is more clearly seen in FIGS. 3 and 4, the cross-sectional shape of each of the tracks 25 is designed so that the tracks fit snugly in position along the edges of at least a portion of the opened package. Each track in cross-section (FIG. 4) preferably has a longer leg 251, and a shorter leg 253 separated by a base leg 252. The tracks are preferably made of plastic, for example, clear butyrate, and are designed so that leg 253 is either parallel to leg 251 or slightly inclined inward. That is, angle A in FIG. 4 is preferably either equal to or slightly less than 90 degrees. Tracks 25 are further designed so that the minimum open dimension W between legs 251 and 253 is just slightly greater than the thickness of panel 21 and attached CD holder 25, to permit the tracks to be placed along the edges of the package without undo looseness.

Since the panel containing the CD holder 24 is thicker than the other panel, track 25 will fit snugly along the thicker panel. Similarly, in other DIGIPAK embodiments such as the embodiment shown in FIG. 5, the relative thicknesses of the components in their initial or "open" configuration will vary, depending on their construction and whether or not they contain CD holders. This fact does not prevent the tracks from performing their function since, once the tracks are positioned along the edges of the package, the entire package is commonly sealed in clear shrink-wrap material which holds the described elements in their initial relationship. As will be seen, the longer legs of the tracks overlie a portion of the CD holder thereby helping to retain the CD in place in some DIGIPAK configurations, and overlie a portion of a panel folded over said CD and holder in other DIGIPAK configurations.

Other DIGITRAK embodiments also make use of the tracks. For example, the embodiment shown in FIGS. 5 and 6 employs an additional panel 26, suitable for graphic treatment or the placement of, among other things, song lyrics or photos or another CD holder, and separated from panel 22 by a strip 27. For display purposes, to maintain an overall length L of approximately 12 inches, panel 26 is folded over panel 22, by fold lines at the edges of strip 27 as is further described in the '812 patent. In this embodiment, as in the embodiment previously described, track 25 can be used to maintain the appropriate orientation of the elements of the DIGIPAK for display purposes.

Figure 5:
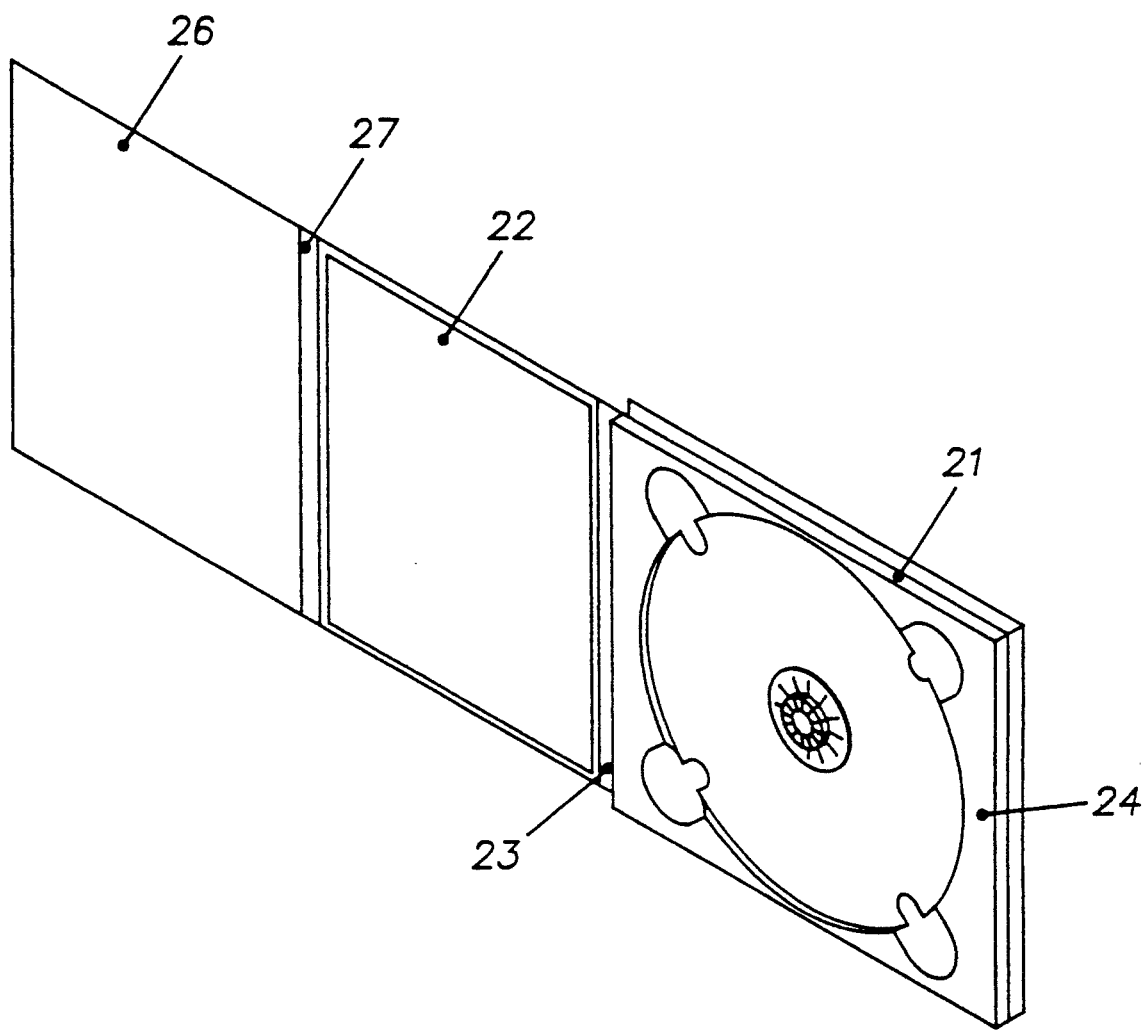
FIG. 5 shows a perspective view of another variety of a CD package of the type generally known as a DIGIPAK ®, in an open orientation.
Figure 7B:
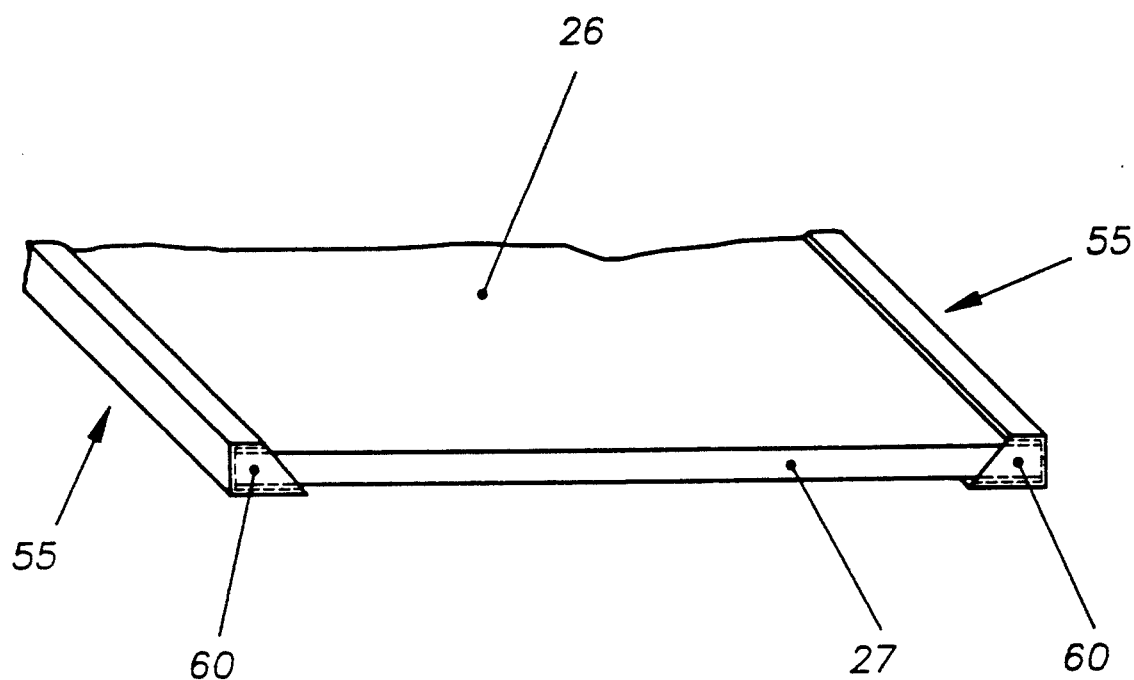
FIG. 7b shows an additional perspective view of a modified track.

Indeed, the track of the present invention are particularly useful in connection with more complex DIGIPAK embodiments such as that shown in FIGS. 5 and 6. When the third panel 26 is added, the outside face of its strip 27 becomes another end surface suitable for the placement of graphical or print information. It is commercially desirable, especially in such circumstances, that the strip 27 be maintained perpendicular to the adjacent panels 22 and 26 when the assemblage is assembled and shrink-wrapped for viewing by a potential purchaser. To accomplish this, the track can be modified as shown in perspective view FIG. 7 and cross-sectional view FIG. 7a.

While track 55 as shown in those figures is generally of the same cross-sectional shape as track 25, it has at least one closed end 60 and at least one tab 65 molded or affixed to its channel near the midpoint of its length. As is shown more clearly in FIG. 7a, tab 65 is preferably rectangular in shape and is formed or attached to the track 65 so as to leave a gap 70 along the base of track 65 adjacent to its shorter leg. Gap 70 is of sufficient height to permit one panel thickness to lie within it but not of sufficient height to also admit a second panel, with or without the additional thickness represented by an optional second, third or fourth CD holder.

When the modified track is used with a three- or more part DIGIPAK as is shown in FIG. 5, panel 26 is first folded over panel 22, and then closed end 60 of track 55 is placed like a cap over either the end of the assemblage represented by the strip 27 or the opposite end of the assemblage 29 (in FIG. 5) as tracks 55 are placed along both sides of the DIGIPAK. The longitudinal position of tab 65 along track 55 is chosen so that tab 65 is located just past the free end of panel 26 when closed end 60 of the track is in contact with the assemblage and panel 27 is substantially perpendicular to both of panels 22 and 26 (this being the configuration most desired for commercial display). Since gap 70 will not permit panel 26 to slip beneath tab 65 even when tight shrink-wrap is applied to the assemblage, panel 27 will remain in its preferred position, with the graphics on its outer face clearly visible, at all times.

As has been demonstrated, the present invention provides a low-cost container for CDs that is compatible with existing retail equipment yet is ecologically sound and attractive.

What is claimed is:

1. A package for a compact disc comprising:
   a rectangular sheet comprising at least a first and second section, each section being separated from adjacent sections by a strip having a width small relative to the width of the sections, each strip being bounded by fold lines;
   a compact disc holder affixed to a section;
   the width of at least one strip being predetermined so that when the first section bounding said strip is folded over the adjacent section, the surface of said strip is perpendicular to the surfaces of the sections; and
   a J-shaped track comprising a longer and a shorter leg and an opening disposed along one side of the sheet, the opening in the track being slightly larger than the overall thickness of the section having the compact disc holder affixed thereto, the longer leg of the track being dimensioned so that it extends at least partially over the front of a compact disc mounted on the holder.

2. A package for a compact disc comprising:
   a rectangular sheet comprising at least a first and second section, each section being separated from adjacent sections by a strip having a width small relative to the width of the sections, each strip being bounded by fold lines;
   a compact disc holder affixed to a section;
   the width of at least one strip being predetermined so that when the first section bounding said strip is folded over an adjacent section, the surface of said strip is perpendicular to the surfaces of the sections; and
   two J-shaped tracks, each comprising a longer and a shorter leg and an opening, the opening in the tracks being slightly larger than the overall thickness of the section having the compact disc holder affixed thereto, the tracks being disposed along both sides of the sheet with the longer leg of each track extending at least partially over the front of a compact disc mounted on the holder.

3. A package for a compact disc comprising:

a rectangular sheet comprising at least a first, second and third section, each section being separated from adjacent sections by a strip having a width small relative to the width of the sections, each strip being bounded by fold lines;

a compact disc holder affixed to a section;

the width of each strip being predetermined so that when the first section bounding said strip is folded over the other section bonding said strip, the surface of said strip is perpendicular to the surfaces of the sections; and a first and second J-shaped track, each comprising a longer and a shorter leg and an opening, at least one of which has a closed end and a tab on the inner surface of the base leg of the track intermediate to the ends thereof, the opening in each track being slightly larger than the overall thickness of the section having the compact disc holder affixed thereto, the tracks being disposed along both sides of the sheet after the first section is folded over the adjacent section, with the longer leg of each track extending at least partially over the front of a compact disc mounted on the holder;

the tab being spaced a distance from the closed track end approximately equal to the width of the first section so that, when the fist section is folded over the adjacent section with said strip being perpendicular to the first section and the adjacent section, the tab contacts the free end of the first section and prevents further movement thereof.

4. The package of claim 1 wherein the compact disc holder comprises injection molded plastic.

5. The package of claim 1 wherein the compact disc holder includes at least one finger slot.

6. The package of claim 1 wherein the sheet includes indicia on one or more surfaces.

7. The package of claim 1 wherein the sheet comprises paperboard.

8. The package of claim 1 wherein the resilient material comprises injection molded plastic.

9. The package of claim 2 wherein the compact disc holder comprises injection molded plastic.

10. The package of claim 2 wherein the compact disc holder includes at least one finger slot.

11. The package of claim 2 wherein the sheet includes indicia on one or more surfaces.

12. The package of claim 2 wherein the sheet comprises paperboard.

13. The package of claim 2 wherein the resilient material comprises injection molded plastic.

14. The package of claim 3 wherein the compact disc holder comprises injection molded plastic.

15. The package of claim 3 wherein the compact disc holder includes at least one finger slot.

16. The package of claim 3 wherein the sheet includes indicia on one or more surfaces.

17. The package of claim 3 wherein the sheet comprises paperboard.

18. The package of claim 3 wherein the resilient material comprises injection molded plastic.

* * * * *